(12) United States Patent
Lancioni et al.

(10) Patent No.: US 7,552,710 B2
(45) Date of Patent: Jun. 30, 2009

(54) VARIABLE GEOMETRY INTAKE MANIFOLD FOR AN INTERNAL COMBUSTION ENGINE

(75) Inventors: Federico Lancioni, Sangemini (IT); Michele Pecora, Potenza (IT); Stefano Fornara, Modena (IT)

(73) Assignee: Magneti Marelli Powertrain S.p.A., Corbetta (IT)

( * ) Notice: Subject to any disclaimer, the term of this patent is extended or adjusted under 35 U.S.C. 154(b) by 0 days.

(21) Appl. No.: 11/973,072

(22) Filed: Oct. 5, 2007

(65) Prior Publication Data
US 2008/0127929 A1 Jun. 5, 2008

(30) Foreign Application Priority Data
Oct. 5, 2006 (EP) .................................. 06425680

(51) Int. Cl.
*F02D 9/10* (2006.01)
(52) U.S. Cl. .................. 123/336; 123/337; 123/308; 123/432; 251/286; 251/288
(58) Field of Classification Search .............. 123/336, 123/337, 308, 432; 251/286, 288
See application file for complete search history.

(56) References Cited

U.S. PATENT DOCUMENTS

| | | | | | |
|---|---|---|---|---|---|
| 2,059,687 | A | * | 11/1936 | Gagg | 251/286 |
| 5,704,333 | A | * | 1/1998 | Okumura et al. | 123/308 |
| 6,164,623 | A | * | 12/2000 | Ito et al. | 251/305 |
| 6,371,080 | B1 | * | 4/2002 | Saito et al. | 123/337 |
| 6,868,828 | B2 | * | 3/2005 | Kondo | 123/339.26 |
| 7,266,891 | B2 | * | 9/2007 | Hannewald | 29/890.12 |
| 7,293,546 | B1 | * | 11/2007 | Confer et al. | 123/308 |
| 7,320,305 | B2 | * | 1/2008 | Alberghini et al. | 123/336 |
| 2003/0145827 | A1 | * | 8/2003 | Klug et al. | 123/396 |
| 2005/0028871 | A1 | | 2/2005 | Kurita et al. | 137/554 |
| 2005/0178355 | A1 | * | 8/2005 | Soshino et al. | 123/337 |

FOREIGN PATENT DOCUMENTS

| | | |
|---|---|---|
| DE | 19918777 | 10/2000 |
| DE | 10319403 | 12/2004 |
| EP | 0701057 | 3/1996 |
| EP | 1571299 | 9/2005 |
| FR | 2108817 | 5/1972 |

OTHER PUBLICATIONS

European Search Report dated Mar. 5, 2007 based on European application No. EP06425680.

* cited by examiner

*Primary Examiner*—Erick Solis
(74) *Attorney, Agent, or Firm*—Ohlandt, Greeley, Ruggiero & Perle, L.L.P.

(57) ABSTRACT

A variable geometry intake manifold for an internal combustion engine; the intake manifold presents: at least one intake pipe which connects the intake manifold to at least one cylinder of the internal combustion engine; and a choking system to vary the geometry of the intake manifold and comprising at least one choke valve provided with a choke body, which is arranged within the intake pipe and is turnably mounted about an axis of rotation; the choke valve integrates therein a pair of mechanical stoppers, which respectively determine the location of an active position and of a home position of the choke body.

17 Claims, 9 Drawing Sheets

VARIABLE GEOMETRY INTAKE MANIFOLD FOR AN INTERNAL COMBUSTION ENGINE

TECHNICAL FIELD

The present invention relates to a variable geometry intake manifold for an internal combustion engine.

BACKGROUND ART

An internal combustion engine is provided with a number of cylinders, each of which is connected to an intake manifold by means of at least one intake valve and to an exhaust manifold by means of at least one exhaust valve. The intake manifold receives fresh air (i.e. air from the external environment) through a feeding pipe provided with a butterfly valve and is connected to the cylinders by means of corresponding intake pipes, each of which ends at least one intake valve.

In modern internal combustion engines, the intake manifold is more and more frequently of the variable geometry type, i.e. is provided with a choke device, which varies the introduction section of the air in the intake pipes according to the engine speed (i.e. to the angular speed of rotation of the crankshaft) to increase the engine performances by reducing at the same time the polluting emissions. At low speeds, the introduction section of the air through the intake pipes is decreased so as to generate turbulences in the intake air flow which improve the mixing of air and fuel in the cylinders; in virtue of the presence of these turbulences which improve the mixing all the injected fuel is burnt and therefore the polluting emissions generated by the combustion are reduced. At high speeds, the introduction section of the air is maximised through the intake pipes so as to allow a complete filling of the cylinders and therefore allow the generation of the maximum possible power.

For example, the choke devices of the type described above may be either tumble devices or swirl devices. For each intake pipe, a tumble device uses a choke body mobile between an active (or choke) position, in which the choke body reduces the transversal section of the intake pipe, and a home (or maximum opening) position, in which the choke body does not determine any reduction of the air introduction section of the intake pipe. For each intake pipe, a swirl system contemplates that each intake pipe comprises two channels and uses a choke body inserted in one of the two channels and mobile between the active position, in which the choke body completely closes the corresponding channel, and a home position (or maximum opening position), in which the choke body does not determine a significant reduction of the introduction section of the air of the corresponding channel.

In the commercial choke devices, all the choke bodies are keyed onto a common shaft to turn together from and towards the active position under the bias of a common actuator device, which is adapted to simultaneously and synchronously control the position of all the choke devices themselves. Normally, the common actuator device integrates therein a pair of mechanical stoppers, which respectively determine the location of the active position and of the home position; the function of the mechanical stoppers is both to delimit the range of displacement of the choke bodies, and to constitute a positive position reference for the driving system of the actuator device.

It has been observed that due to the constructive tolerances of the commercial choke devices, the actual location of the active and home positions determined by the mechanical stoppers integrated in the common actuator device may present a considerably difference with respect to the ideal location hypothesised in design. A first solution to this problem was to reduce the constructive tolerances by using more precise machining processes; however, such solution implies an inevitable and considerable increase in production costs.

DISCLOSURE OF INVENTION

It is the object of the present invention to provide a variable geometry intake manifold for an internal combustion engine, which intake manifold is free from the drawbacks described above, and specifically, is easy and cost-effective to manufacture.

According to the present invention, a variable geometry intake manifold for an internal combustion engine is provided as claimed in the attached Claims.

BRIEF DESCRIPTION OF THE DRAWINGS

The present invention will now be described with reference to the accompanying drawings which illustrate a non-limitative example of embodiment thereof, in which.

PREFERRED EMBODIMENTS OF THE INVENTION

Figure 1:
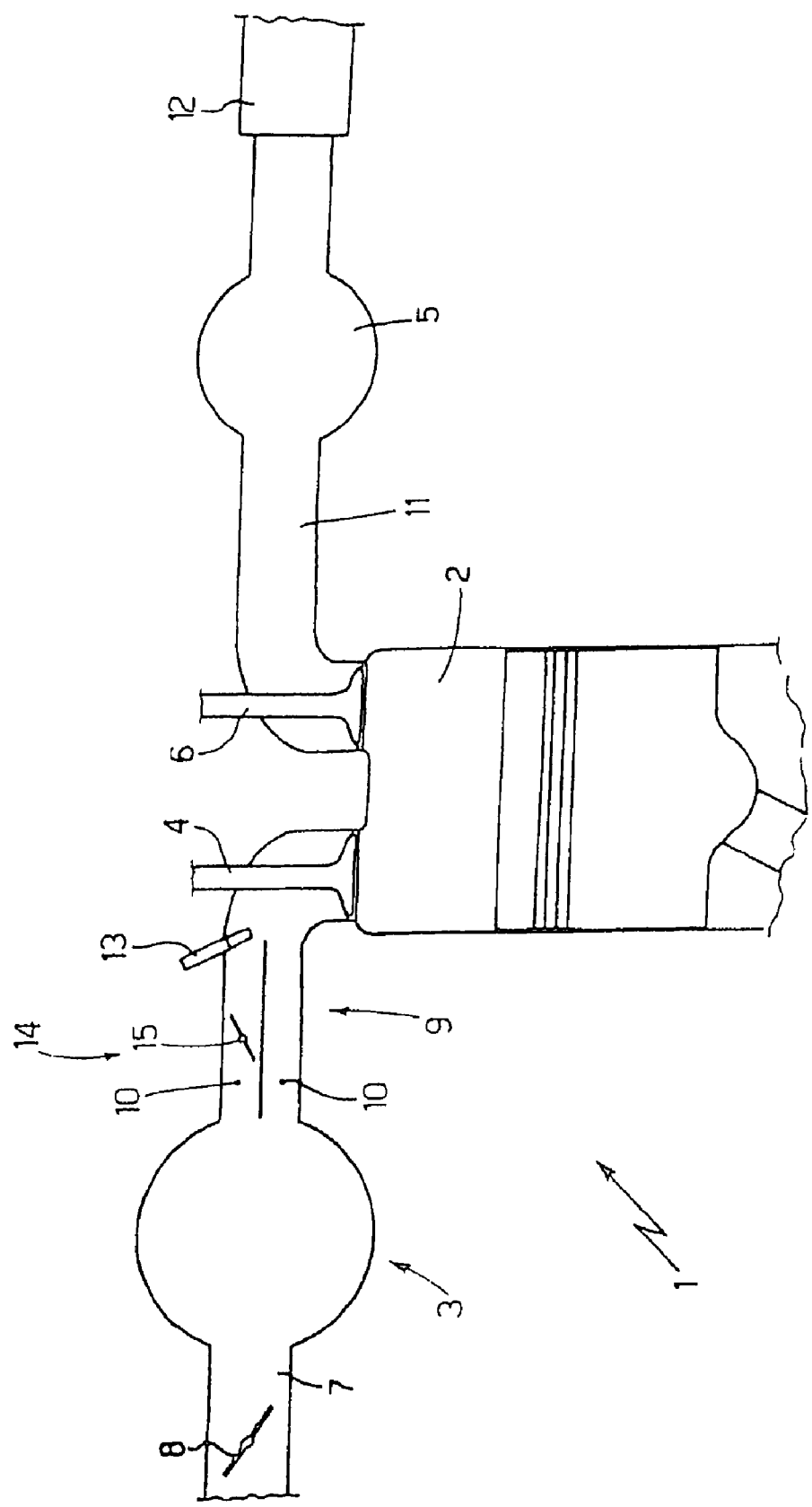
FIG. 1 is a schematic view of an internal combustion engine provided with a variable geometry intake manifold made according to the present invention and provided with a swirl type choking system.

In FIG. 1, numeral 1 indicates as a whole an internal combustion engine provided with four cylinders 2 (only one of which is shown in FIG. 1), each of which is connected to an intake manifold 3 by means of two intake valves 4 (only one of which is shown in FIG. 1) and an exhaust manifold 5 by means of two exhaust valves 6 (only one of which is shown in FIG. 1).

Intake manifold 3 receives fresh air (i.e. air from the external environment) through a feeding pipe 7 regulated by a butterfly valve 8 and is connected to cylinders 2 by means of corresponding intake pipes 9 (only one of which is shown in FIG. 1), each of which comprises two channels 10 (possibly of different length, shape and/or dimensions) and is regulated by corresponding intake valves 4. Similarly, exhaust manifold 5 is connected to cylinders 2 by means of corresponding exhaust conduits 11 (only one of which is shown in FIG. 1), each of which is regulated by corresponding exhaust valves 6; an emission pipe 12, which ends with a muffler (known and not shown) to emit the gases produced by combustion into the atmosphere departs from exhaust manifold 5.

According to a preferred embodiment, the fuel (e.g. petrol, diesel, methane or LPG) is injected within each intake pipe 9 by means of a corresponding injector 13 arranged near corresponding intake valves 4. According to a different embodiment (not shown), injectors 13 are arranged so as to directly inject the fuel within each cylinder 2.

Intake manifold 3 is a variable geometry manifold and comprises a choking system 14, which is adapted to vary during the operation of engine 1 the introduction section of the air of intake pipes 9 according to the speed of engine 1 itself. According to the embodiment shown in FIG. 1, choking system 14 is of the swirl type and, for each intake pipe 9, comprises a choke valve 15 which is mounted along one of the two channels 10 of intake pipe 9 and is adapted to vary the introduction section of the air through channel 10 itself; specifically, each choke valve 15 is mobile between an active (or choke) position, in which choke valve 15 reduces the introduction section of the air of intake pipe 9 by completely closing corresponding channel 10, and a home (or maximum opening) position, in which choke valve 15 does not determine a significant reduction of the introduction section of the air of intake pipe 9.

Figure 2:
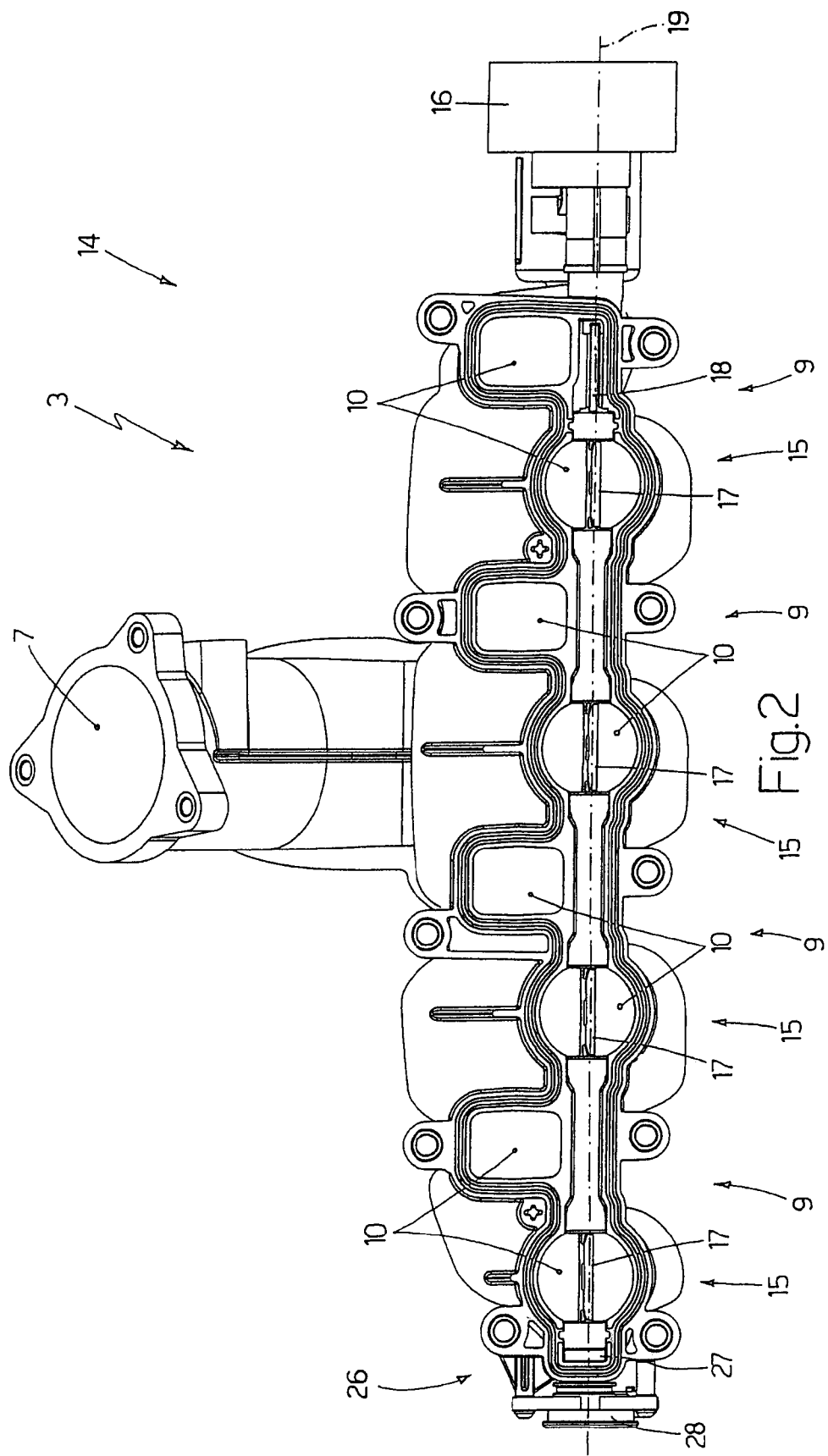
FIG. 2 is a front view of the intake manifold in FIG. 1 with parts removed for clarity.

According to that shown in FIG. 2, the four choke valves 15 are aligned and actuated by a common actuator device 16 (preferably provided with an electrical motor) arranged laterally with respect to intake manifold 3 and aligned with the four choke valves 15. Each choke valve 15 comprises a choke body 17, specifically a butterfly valve plate 17 (better shown in FIG. 3), which is keyed to a common shaft 18 (i.e. shared by all four choke valves 15) so as to turn with common shaft 18 itself about an axis of rotation 19 and under the bias of actuator device 16 between the active position and the home position.

Figure 3:
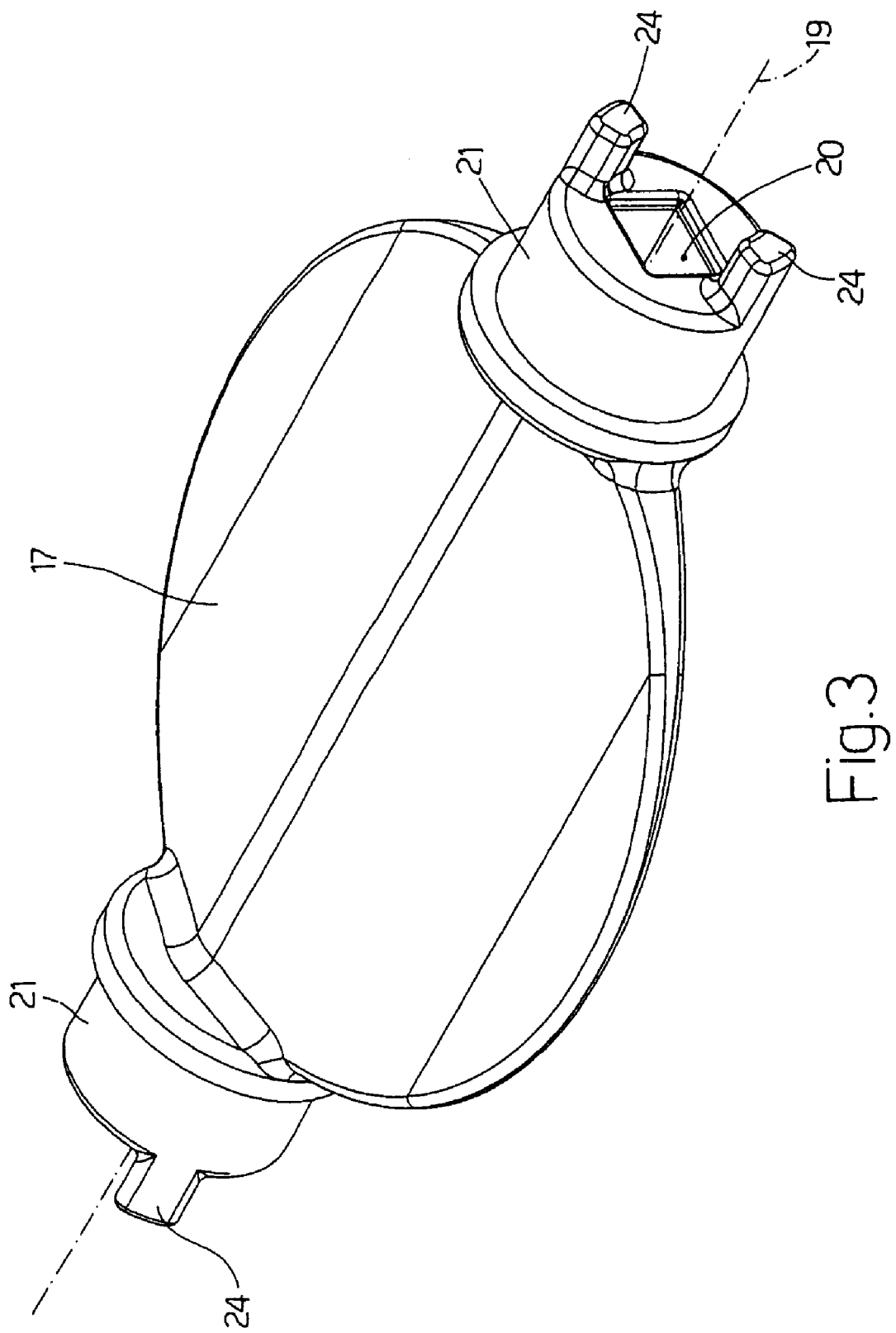
FIG. 3 is a perspective view of a butterfly valve plate of a choke valve of the choking system in FIG. 1.

According to a preferred embodiment shown in FIG. 3, each butterfly valve plate 17 presents a central through hole 20 and a square section within which common shaft 18 is inserted; the square section of hole 20 allows to render butterfly valve plate 17 angularly integral with shaft 18 by means of geometric interference and therefore without the need for further mechanical adjustments. Furthermore, on the opposite sides of each butterfly valve plate 17 and coaxially to through hole 20 there are obtained two cylindrical expansions 21, which are inserted in corresponding cylindrical seats 22 (one of which is shown in FIG. 4) obtained in a valve body of choke valve 15 to define some bearings which guide the rotation of butterfly valve plate 17 about axis of rotation 19.

In use, each butterfly valve plate 17 turns under the bias of actuator device 16 between the active position (shown in FIG. 5), in which the introduction section of the air of intake pipe 9 is reduced, and the home position (shown in FIG. 6), in which the introduction section of the air of intake pipe 9 is not appreciably reduced.

Figure 4:
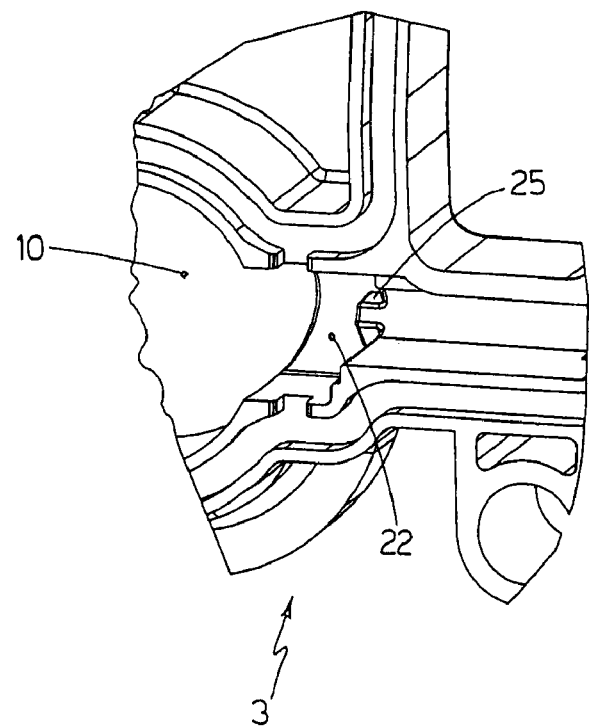
FIG. 4 is a perspective view of a valve seat of a choke valve of the choking system in FIG. 1 with parts removed for clarity.
Figure 5:
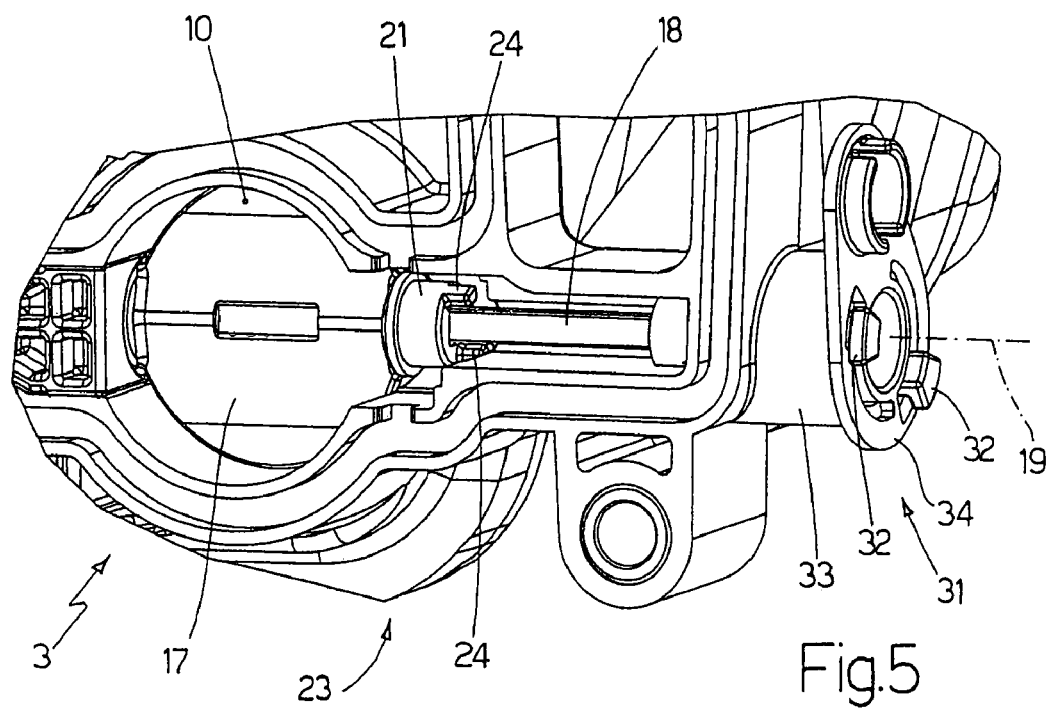
FIG. 5 is a perspective view of a choke valve of the choking system in FIG. 1 in an active or choke position with parts removed for clarity.
Figure 6:
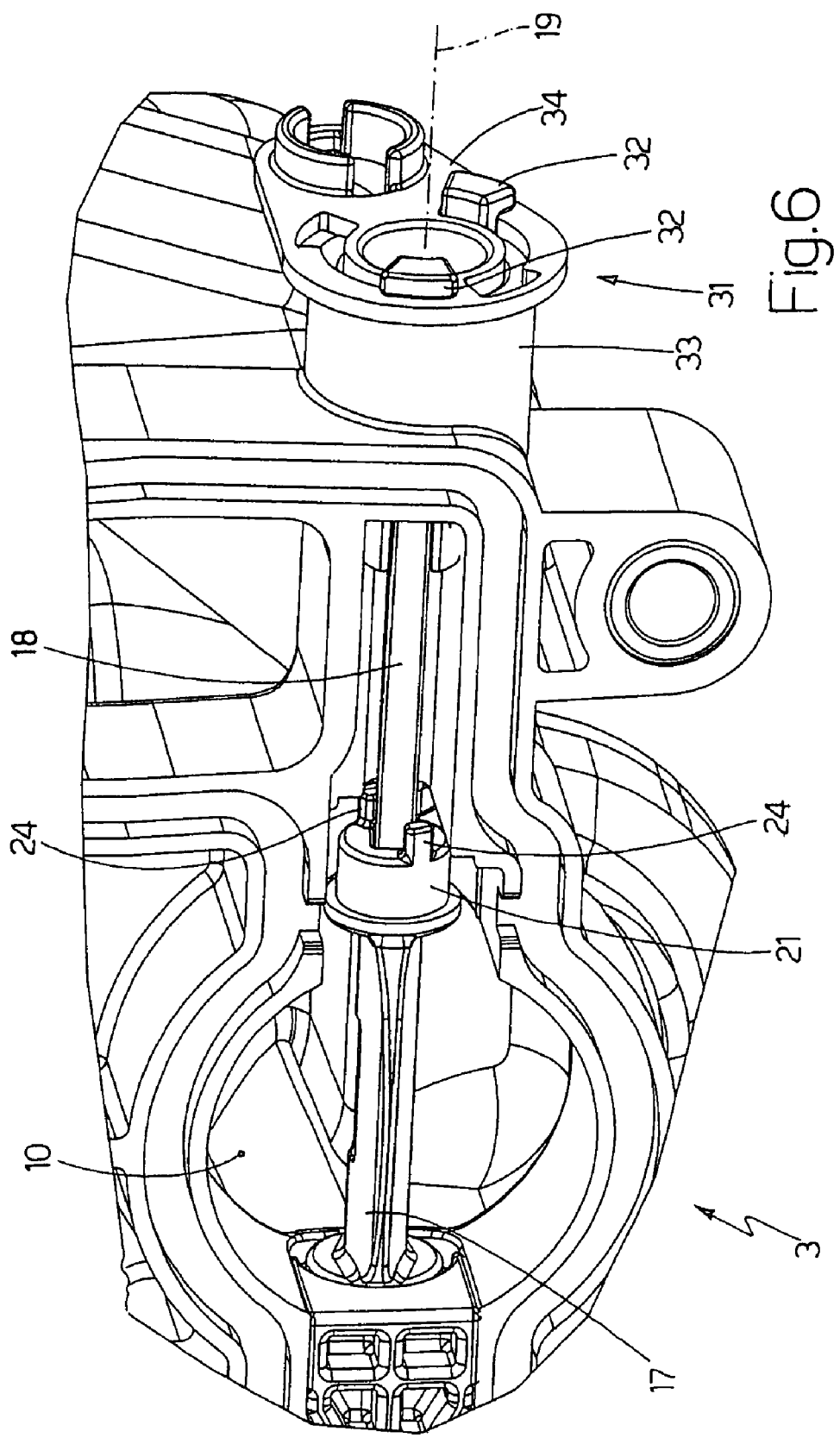
FIG. 6 is a perspective view of a choke valve of the choking system in FIG. 1 in a home or maximum opening position with parts removed for clarity.

As shown in FIGS. 3, 4 and 5, each choke valve 15 integrates therein a pair of mechanical stoppers 23, which respectively determine the location of the active position and of the home position. Each stopper 23 comprises an abutment tooth 24, which is mobile, is arranged parallel and staggered with respect to axis of rotation 19, and is integral with butterfly valve plate 17, and a matching element 25, which is fixed, is integral with a fixed valve body of choke valve 15, and is arranged along the trajectory of movement of corresponding abutment tooth 24 to stop the movement of corresponding abutment tooth 24 and therefore of butterfly valve plate 17. Preferably, abutment teeth 24 rise from a cylindrical expansion 21 and therefore matching elements 25 are obtained within a cylindrical seat 22. Furthermore, both matching elements 25 preferably consist of a single circular crown portion obtained within a cylindrical seat 22.

According to a preferred embodiment, each choke valve 15 integrates therein only one pair of mechanical stoppers 23 arranged at one of the two cylindrical expansions 21 of butterfly valve plate 17. According to a different embodiment (not shown), each choke valve 15 integrates therein two pairs of mechanical stoppers 23 arranged at both of the two cylindrical expansions 21 of butterfly valve plate 17. According to a further embodiment (not shown), only one of the four choke valves 15 integrates a pair of mechanical stoppers 23; however, this embodiment implies higher manufacturing costs because it obliges to produce two different types of butterfly valve plates 17 (with abutment teeth 24 and without abutment teeth 24).

According to a different embodiment (not shown), choking system 14 is of the tumble type; in this case, each intake pipe 9 comprises a single channel 10 in which there is arranged a choke valve mobile between the active (or choke) position, in which choke valve 15 reduces the introduction section of the air of intake pipe 9, and the home (or maximum opening) position, in which choke valve does not determine any reduction of the introduction section of the air of intake pipe 9.

According to a further embodiment (not shown), choking system 14 is of the PDA (Port De-Activation) type.

Choking system 15 described above is at the same time both simple and cost-effective to manufacture, and particularly precise and compliant to design specifications. Such results are obtained by integrating mechanical stoppers 23 within choke valves 15 and specifically by integrating mechanical stoppers 23 in butterfly valve plates 17. In this way, also with a not particularly precise (and therefore simple and cost-effective) construction method, it is possible to establish the actual location of the active and the home positions with sufficient precision.

Figure 7:
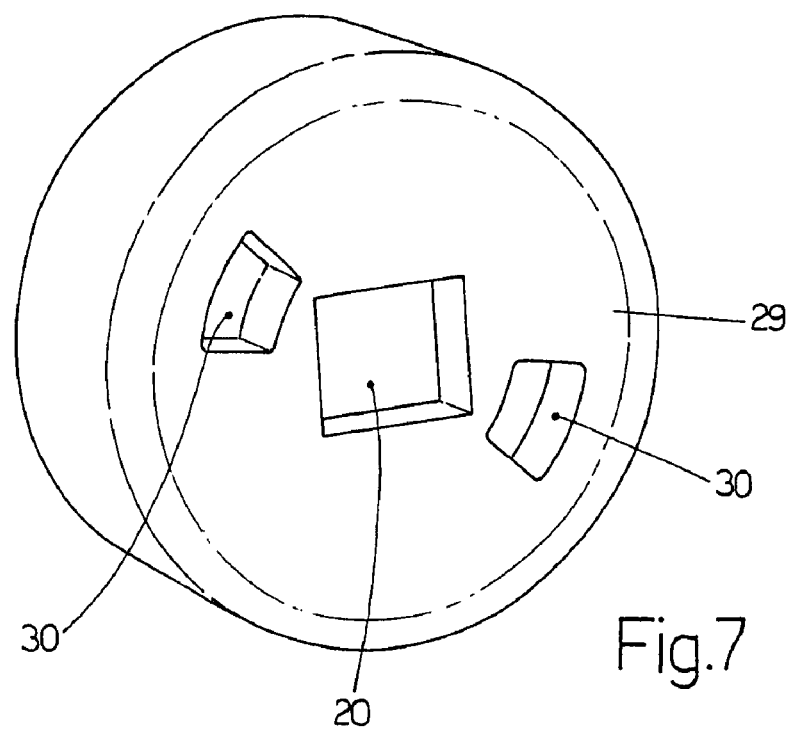
FIGS. 7 and 8 are different perspective views of a rotor of an angular position sensor of the choking system in FIG. 1.
Figure 8:
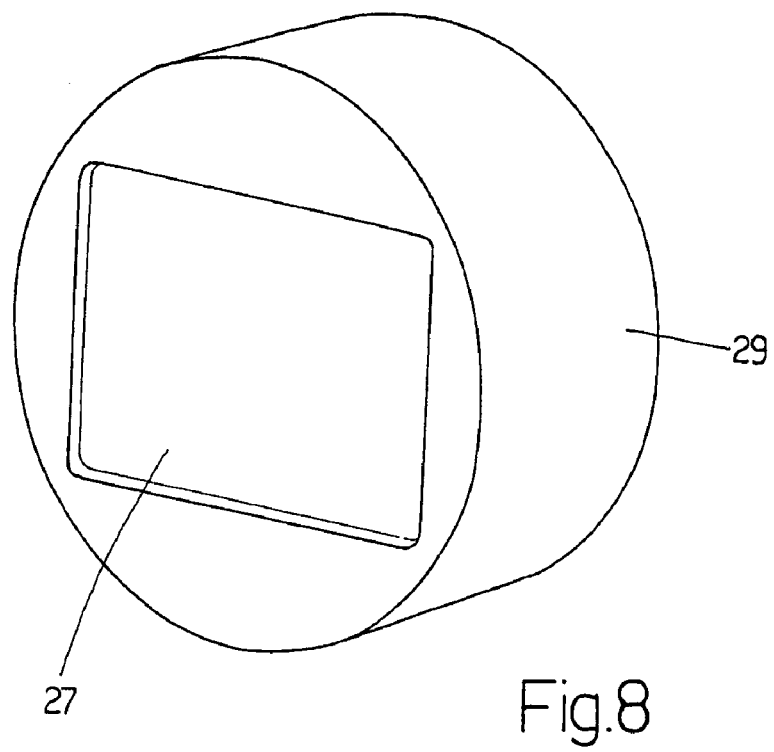
Figure 9:
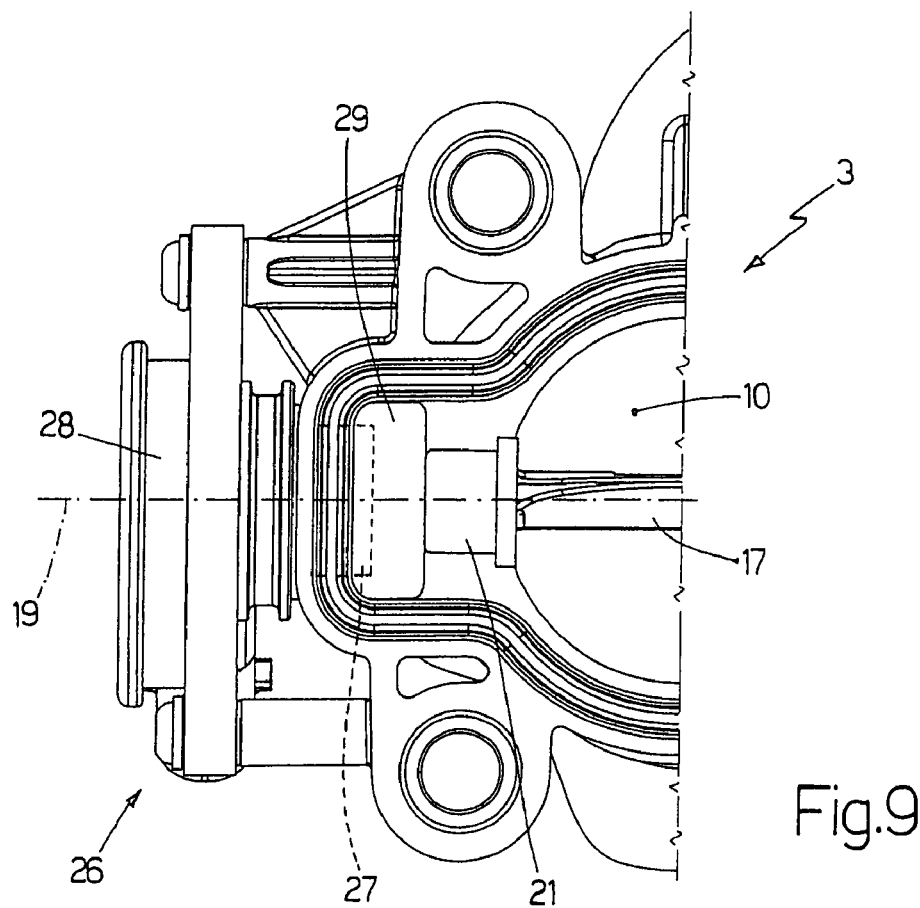
FIG. 9 is a front view of an angular position sensor of the choking system in FIG. 1 with parts removed for clarity.
Figure 10:
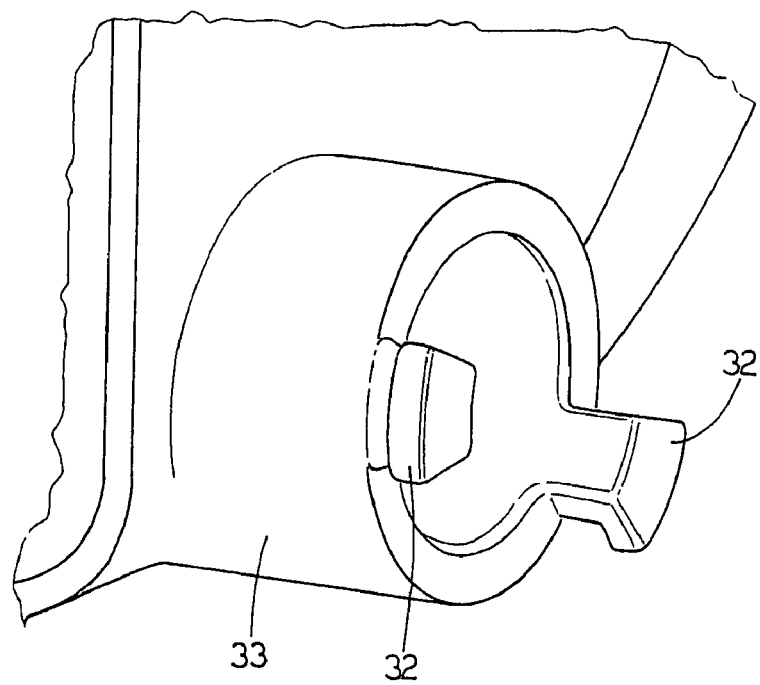
FIG. 10 is a perspective view of a fixed element of a mechanical coupling between a shaft of the choke valves of the choking system in FIG. 1 and a shaft of an actuator device of the choking system in FIG. 1.
Figure 11:
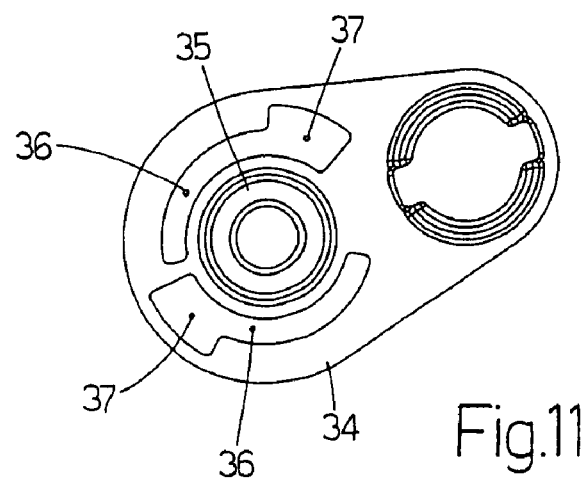
FIG. 11 is a plan view of a mobile element of the mechanical coupling in FIG. 10.

According to that shown in FIGS. 7, 8 and 9, choking system 14 comprises an angular position sensor 26 coupled to an end of common shaft 18 and arranged on opposite band with respect to actuator device 16 to determine the angular position of common shaft 18 about axis of rotation 19. It is important to observe that position sensor 26 is coupled to the farthest choke valve 15 from actuator device, because such choke valve 15 is arranged in the last place of the mechanical transmission which transmits the motion from actuator device 16 and therefore is the most subject to possible mechanical problems.

Angular position sensor 26 comprises a square-section permanent magnet 27 integral with common shaft 18, and a reader 28, which is of the magneto-resistive type, is adapted to read the orientation of permanent magnet 27, and is arranged outside intake pipe 9 near a wall of intake pipe 9 itself and near permanent magnet 27. Preferably, permanent magnet 27 is embedded (preferably by co-moulding) in a cylindrical cradle 29, which is coupled to butterfly valve plate 17 of choke valve 15; for this purpose, cylindrical cradle 29 presents a pair of holes 30, which are adapted to be engaged by abutment teeth 24 of butterfly valve plate 17 which in this case are not used as part of a stopper, but as mechanical coupling members for cradle 29.

The use of angular position sensor 26 described above presents a number of advantages, because such angular position sensor 26 is cost-effective, easy and fast to assemble and presents a high measuring precision. Specifically, the assembly of angular position sensor 26 is easy and fast because reader 28 of angular position sensor 26 is arranged outside intake pipe 9 and therefore no type of perforation of intake pipe 9 is required; furthermore, checking, maintaining or replacing reader 28 of angular sensor 26 is simple and immediate also when intake manifold 3 is mounted in engine 1.

Angular position sensor 26 described above does not introduce any type of friction on the rotation of common shaft 18 because reader 28 of angular position sensor 26 is of the contactless type and therefore is mechanically independent from permanent magnet 24 and because it does not require the presence of any dynamic or static seal ring coupled to common shaft 18.

Finally, angular position sensor 26 described above directly detects the actual position of butterfly valve plates 17 and is capable of detecting whether a butterfly valve plate 17 no longer receives the motion from actuator device 16 because of a mechanical problem.

According to that shown in FIG. 2, a drive shaft (not shown) of actuator device 16 is coaxial with axis of rotation 19 (i.e. with common shaft 18) and consequently is directly head-linked to common shaft 18 without interposition of mechanical transmissions which vary the transmission ratio.

According to that shown in FIGS. 10-14, in order to maintain common shaft 18 in the correct axial position there is contemplated a lock coupling 31 (shown in FIGS. 12-14) which maintains common shaft 18 within intake manifold 3.

Lock coupling 31 comprises a pair of coupling elements 32, each of which presents an "L"-shape and protrudes from an outer tubular body 33 of intake manifold 3. Furthermore, lock coupling 31 comprises a plate 34, which centrally presents a central cup 35 which presses on the end of common shaft 18 to maintain common shaft 18 itself in the correct axial position within intake manifold 3. Plate 34 further presents a pair of tracks 36, each of which presents the shape of an arc of circumference, is arranged about central cup 35, ends with a flared inlet opening 37, and is engaged in use by a coupling element 32. Specifically, each track 36 presents a dimension so as to prevent the axial removal of coupling element 32 along its entire length except for the input opening 37 at which coupling element 32 may be axially inserted or removed.

Figure 12:
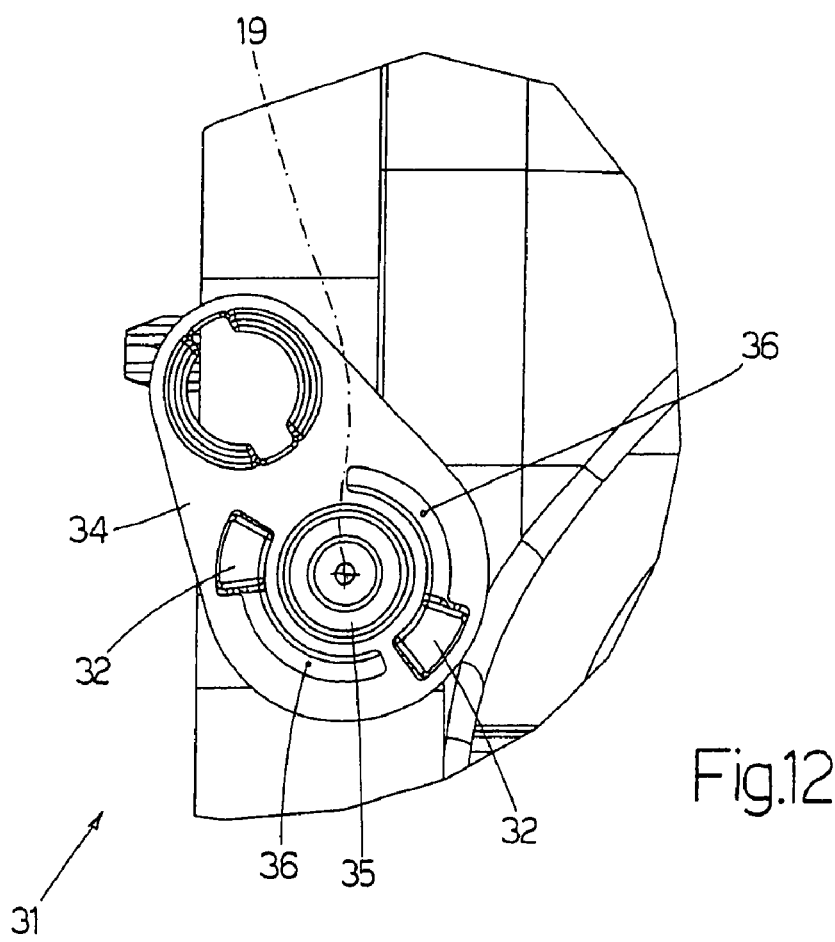
FIGS. 12, 13 and 14 are front views of the mechanical coupling in FIG. 10 respectively in an assembly position, in a working position corresponding to an active or choke position of the choke valves, and in a working position corresponding to a home or maximum opening position of the choke valves.
Figure 13:
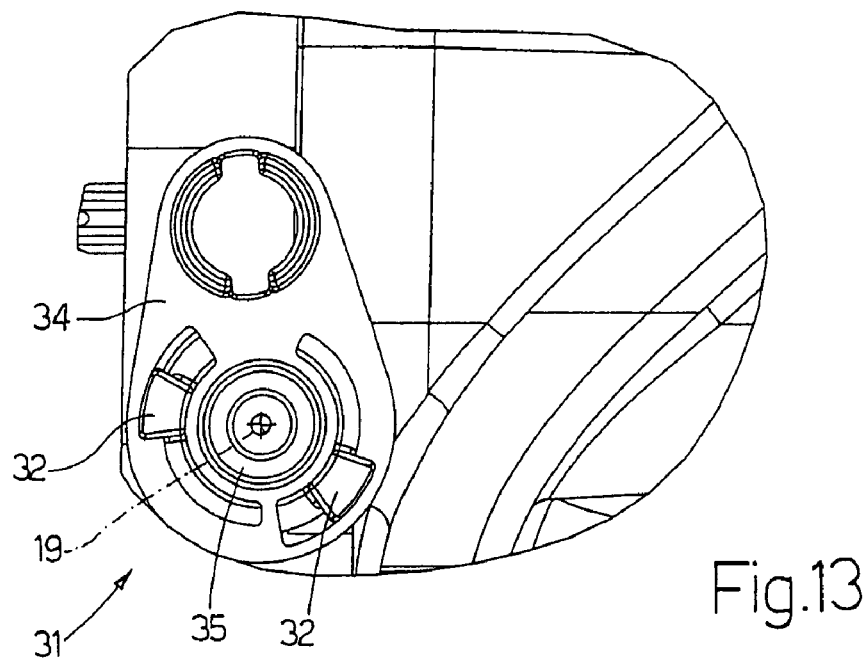
Figure 14:
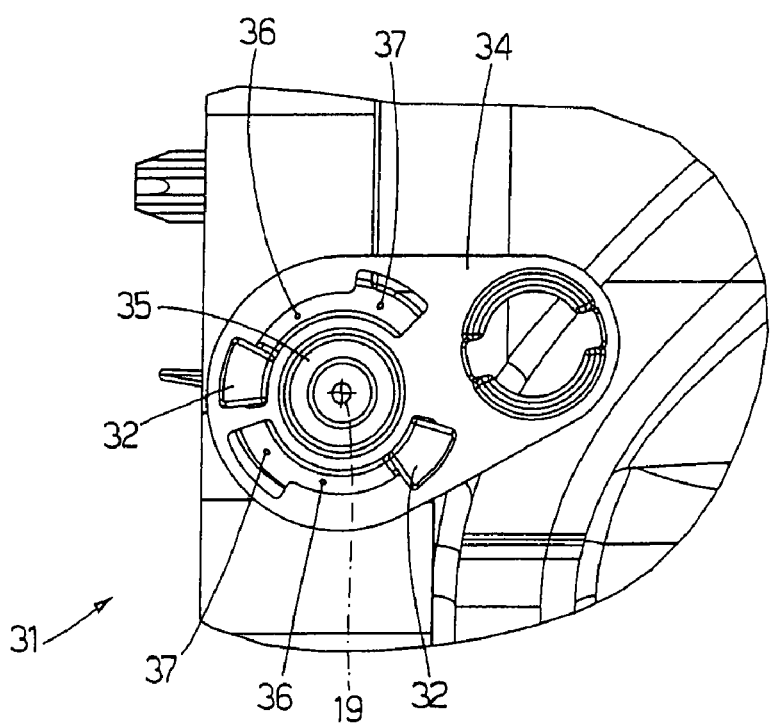

During the assembly of plate 34, plate 34 itself is directed so as to make the position of inlet openings 37 coincide with the position of coupling elements 32; at this point, plate 34 itself may be coupled to outer body 33 of intake manifold 3 by inserting coupling elements 32 through inlet openings 37 (FIG. 12). Subsequently, plate 34 is turned with respect to outer body 33 of intake manifold 3 so as to distance coupling elements 32 from inlet openings 37 and, in use, plate 34 is no longer returned to the assembly position in which the position of inlet openings 37 coincides with the position of coupling elements 32 (FIGS. 13 and 14).

In other words, during normal operation when plate 34 turns along with common shaft 18, coupling elements 32 of outer body 33 slide along tracks 36 without ever reaching the assembly position in which the position of inlet openings 37 coincides with the position of coupling elements 32. FIG. 13 shows the position of plate 34 when choke valves 15 are arranged in active or closed position, while FIG. 13 shows the position of plate 34 when choke valve 15 are arranged in home or maximum opening position.

According to a preferred embodiment, plate 34 is used as actuating lever of common shaft 18, i.e. as power take-off to turn common shaft 18 about axis of rotation 19. In other words, actuator device 16 transmits the motion to common shaft 18 by means of plate 34 which acts as actuating lever. For this purpose, plate 34 is keyed to (i.e. is made angularly integral with) an end of common shaft 18 by means of an appropriate coupling by shape between the end of common shaft 18 and central cup 35 of plate 34.

According to a different embodiment (not shown), lock coupling 31 comprises a higher number of sealing elements 32 (e.g. three or four).

Lock coupling 31 described above presents a number of advantages, because it is extremely simple and cost-effective to manufacture and to assemble; specifically, such lock coupling 31 allows to obtain a mechanical locking without using third mechanical members (e.g. screws, bolts, Seeger rings, cotters).

The invention claimed is:

1. A variable geometry intake manifold for an internal combustion engine; the intake manifold comprises: at least one intake pipe which connects the intake manifold to at least one cylinder of the internal combustion engine; and a choking system for varying the geometry of the intake manifold and comprising at least one choke valve provided with a choke body, which is arranged within the intake pipe and is turnably mounted about an axis of rotation; the intake manifold has the choke valve that integrates therein a pair of mechanical stoppers, which determine the location respectively of an active position and of a home position of the choke body, wherein each stopper comprises an abutment tooth that is mobile arranged parallel and staggered with respect to an axis of rotation, and is connected to the choke body, and a matching element, which is fixed, connected to a fixed valve body of the choke valve, and arranged along the trajectory of movement of the corresponding abutment tooth to stop the movement of the corresponding abutment tooth and therefore of the choke body, wherein the choke body has on each opposite side a cylindrical expansion, which is inserted in a corresponding cylindrical seat obtained in the choke valve to define some bearings that guide the rotation of the choke body about the axis of rotation, wherein the abutment teeth of each stopper rise from its cylindrical expansion and the matching element obtained within the cylindrical seat, and wherein the two matching elements of the two stoppers have a single circular crown portion obtained within the cylindrical seats.

2. The intake manifold according to claim 1, wherein there are contemplated a plurality of intake pipes and a plurality of corresponding choke valves, which are aligned and actuated by a common actuating device arranged laterally with respect to the intake manifold and aligned with the choke valves.

3. The intake manifold according to claim 2, wherein the choke body is a plurality of choke bodies, and wherein each choke body is keyed to a common shaft to turn with the common shaft itself about the axis of rotation and under the bias of the actuator device between the active position and the home position.

4. The intake manifold according to claim 3, further comprising a drive shaft of the actuator device that is coaxial to the axis of rotation and is directly head-linked to the common shaft.

5. The intake manifold according to claim 3, wherein each choke body presents a central through hole and a square section within which the common shaft is inserted.

6. The intake manifold according to claim 2, wherein each choke valve integrates therein the pair of stoppers.

7. The intake manifold according to claim 1, wherein the choking system is of the swirl type; the intake pipe presents two channels, one of which is engaged by the choke valve to vary the introduction section of the air through the channel itself.

8. The intake manifold according to claim 1, wherein the choking system is of the tumble type; the intake pipe comprises a single channel in which a choke valve is arranged.

9. The intake manifold according to claim 1, wherein the choking system comprises an angular position sensor coupled to an end of a common shaft to determine the angular position of the common shaft about an axis of rotation; the angular position sensor comprises: a permanent magnet fixed to the shaft; and a reader, which is adapted to read the orientation of the permanent magnet and is arranged outside the intake pipe near a wall of the intake pipe itself and near the permanent magnet.

10. The intake manifold according to claim 1, wherein the choke body is keyed to a common shaft to turn with the common shaft itself about the axis of rotation; further comprising a lock coupling to maintain the common shaft in a correct axial position that maintains the common shaft within the intake manifold; the lock coupling comprises: at least one pair of coupling elements, each coupling element has an "L"-shape and protrudes from an outer tubular body of the intake manifold; and a plate with at least one pair of tracks, each track has a shape of an arc of circumference, ends with a flared inlet opening, and is engaged in use by one of the coupling elements; each track has a dimension so as to prevent the axial removal of the coupling elements along its entire length except for the inlet opening at which the coupling elements may be axially removed.

11. The intake manifold according to claim 10, wherein the plate centrally has a central cup which presses on the end of the common shaft to maintain the common shaft itself in the correct axial position within the intake manifold.

12. The intake manifold according to claim 11, wherein the central cup of the plate is rendered angularly integral with the end of the common shaft by means of an appropriate coupling by shape.

13. The intake manifold according to claim 12, wherein the plate acts as actuating lever of the common shaft.

14. A variable geometry intake manifold for an internal combustion engine; the intake manifold comprises: at least one intake pipe which connects the intake manifold to at least one cylinder of the internal combustion engine; and a choking system for varying the geometry of the intake manifold and comprising at least one choke valve provided with a choke body, which is arranged within the intake pipe and is turnably mounted about an axis of rotation; the intake manifold has the choke valve that integrates therein a pair of mechanical stoppers, which determine the location respectively of an active position and of a home position of the choke body, wherein the choke body is keyed to a common shaft to turn with the common shaft itself about the axis of rotation; further comprising a lock coupling to maintain the common shaft in a correct axial position that maintains the common shaft within the intake manifold; the lock coupling comprises: at least one pair of coupling elements, each coupling element has an "L"-shape and protrudes from an outer tubular body of the intake manifold; and a plate with at least one pair of tracks, each track has a shape of an arc of circumference, ends with a flared inlet opening, and is engaged in use by one of the coupling elements; each track has a dimension so as to prevent the axial removal of the coupling elements along its entire length except for the inlet opening at which the coupling elements may be axially removed.

15. The intake manifold according to claim 14, wherein the plate centrally has a central cup which presses on the end of the common shaft to maintain the common shaft itself in the correct axial position within the intake manifold.

16. The intake manifold according to claim 15, wherein the central cup of the plate is rendered angularly integral with the end of the common shaft by means of an appropriate coupling by shape.

17. The intake manifold according to claim 16, wherein the plate acts as actuating lever of the common shaft.

* * * * *